(12) United States Patent
Hirschvogel et al.

(10) Patent No.: US 6,270,083 B1
(45) Date of Patent: Aug. 7, 2001

(54) PACKING YARN MADE OF GRAPHITE FOIL AND PLASTIC FOIL AND METHOD OF MANUFACTURING A PACKING YARN

(75) Inventors: Alfred Hirschvogel, Langweid; Oswin Öttinger, Meitingen; Bernd Schellenberger, Gersthofen, all of (DE); Mike Römmler, Los Angeles, CA (US)

(73) Assignee: SGL Technik GmbH, Meitingen (DE)

( * ) Notice: Subject to any disclaimer, the term of this patent is extended or adjusted under 35 U.S.C. 154(b) by 0 days.

(21) Appl. No.: 09/344,928

(22) Filed: Jun. 28, 1999

(30) Foreign Application Priority Data

Jun. 27, 1998 (DE) .............................................. 198 28 789

(51) Int. Cl.$^7$ ...................................................... F16J 15/20
(52) U.S. Cl. ......................... 277/536; 277/537; 277/539; 277/540; 428/365; 428/408
(58) Field of Search ..................................... 277/536, 537, 277/539, 540, 938, 944; 428/365, 75, 377, 408, 428

(56) References Cited

U.S. PATENT DOCUMENTS

| | | | |
|---|---|---|---|
| 1,171,090 | * | 2/1916 | Cook ..................... 277/536 |
| 3,404,061 | | 10/1968 | Shane et al. . |
| 4,455,334 | * | 6/1984 | Ogino et al. ............ 428/408 |
| 4,705,722 | | 11/1987 | Ueda et al. . |
| 4,961,988 | | 10/1990 | Zhu . |
| 5,134,030 | | 7/1992 | Ueda et al. . |
| 5,225,262 | * | 7/1993 | Leduc ..................... 277/536 |
| 5,240,769 | | 8/1993 | Ueda et al. . |
| 5,370,405 | | 12/1994 | Ueda . |
| 5,509,993 | | 4/1996 | Hirschvogel . |
| 5,549,306 | | 8/1996 | Ueda . |
| 5,605,341 | | 2/1997 | Ueda . |

FOREIGN PATENT DOCUMENTS

| | | |
|---|---|---|
| 33 20 725 A1 | 1/1984 | (DE) . |
| 40 14 719 A1 | 11/1991 | (DE) . |
| 0 253 031 B1 | 1/1988 | (EP) . |
| 0 388 481 A1 | 9/1990 | (EP) . |
| 0 444 456 A1 | 9/1991 | (EP) . |
| 0 519 620 A1 | 12/1992 | (EP) . |
| 0 340 303 B1 | 6/1993 | (EP) . |
| 0 610 670 A1 | 6/1994 | (EP) . |
| 0 616 884 A2 | 9/1994 | (EP) . |
| 0 672 851 A2 | 9/1995 | (EP) . |
| 0 466 923 B1 | 10/1995 | (EP) . |
| 0 681 125 A1 | 11/1995 | (EP) . |
| 0 794 367 A2 | 9/1997 | (EP) . |
| 2 243 883 B | 3/1994 | (GB) . |
| 2 285 067 A | 6/1995 | (GB) . |

* cited by examiner

*Primary Examiner*—Chuck Y. Mah
*Assistant Examiner*—Enoch Peavey
(74) *Attorney, Agent, or Firm*—Herbert L. Lerner; Laurence A. Greenberg; Werner H. Stemer (57) ABSTRACT

A packing yarn and a method of manufacturing a packing yarn utilize at least two bands that are at most 5 mm wide and are joined together by a yarn manufacturing method. The bands are formed of a laminate having at least one layer of flexible graphite foil and at least one layer of a plastic foil with a tensile strength of at least 25 MPa and an elastic modulus of at least 0.4 GPa. The layers of graphite foil and plastic foil are joined by adhesive bonding, by a non-adhesive-like coupling agent or by welding. The bands are produced from the laminates by cutting, which is preferably effected continuously. The advantages thereof are that strips or bands of flexible graphite which have a tensile strength totally inadequate for the manufacture of packing yarns are altered in terms of their mechanical properties in such a way that they may be processed by known methods in an efficient manner into packing yarns, solely through reinforcement with a plastic foil and without using further reinforcing agents such as, for example, yarns, fibers or wires.

41 Claims, 3 Drawing Sheets

PACKING YARN MADE OF GRAPHITE FOIL AND PLASTIC FOIL AND METHOD OF MANUFACTURING A PACKING YARN

BACKGROUND OF THE INVENTION

Field of the Invention

The invention relates to a packing yarn made from at least two bands that are twisted with one another and are formed of a laminate having layers of two alternately disposed laminar materials which are joined to one another, namely firstly at least one layer of flexible graphite and secondly at least one layer of a reinforcing agent or medium, wherein the reinforcing agent is situated on both outwardly directed flat sides of the flexible graphite of the laminate, or only on one of the outwardly directed flat sides of the flexible graphite of the laminate, or on none of the outwardly directed flat sides of the flexible graphite of the laminate.

An embodiment of that packing yarn includes at least two bands which are joined together by a yarn manufacturing method, e.g. by twisting or braiding, wherein the bands are formed of a laminate composed of a layer of flexible graphite, which is joined at least at one of its two flat sides to a reinforcing agent.

Packing yarns of the type described above are used to manufacture seals and, in particular, packings for sealing shaft and spindle glands. According to a known method, two or more packing yarns are combined for that purpose by using a textile processing method such as, for example, braiding, into a cord or plait. Then portions of such cords or plaits that are cut to a specific, predetermined length are compressed in a suitable pressing mould to form a packing ring. A plurality of such packing rings produce a stuffing-box packing, once they have been inserted into an appropriate packing space of a stuffing-box. According to another known method, portions of a cord or plait made from the packing yarns, which have been cut to length and correspond to the dimensions of a specific packing space, are inserted directly into the gland and the packing that is thus produced, which is still highly compressible, is tightened up by the gland until tightness of the packing configuration is achieved.

According to a third method, the packing yarns or packing cords or plaits manufactured from them may be wound directly around a shaft or spindle having a gland to be sealed, until a quantity of packing yarn or packing plait necessary for producing the required packing has been wound on. Then the winding which is thus produced may, after embedding in the packing space, be tightened up with the aid of the gland until tightness of the packing configuration is achieved.

Packing yarns of the type described above are manufactured i.e. using flexible graphite or expanded graphite. Expanded graphite is obtained by briefly heating graphite salts or intercalation compounds of graphite in the form of an open vermicular material. The flexible graphite is obtained by compressing the expanded graphite which is thus obtained, and is generally produced in the form of graphite foils or graphite plates (see, for example, U.S. Pat. No. 3,404,061). In order to manufacture packing yarns or packing cords or plaits through the use of e.g. braiding, knitting or twisting processes, the graphite foils are cut into strips or bands of a specific width and those strips are then further processed into cords, plaits or strands. Despite a specific flexibility, the strips or bands of flexible graphite tear and/or break during such processing methods because their tensile strength, in particular, is too low. For that reason, a great many possible ways of overcoming the previously mentioned problems associated with manufacturing packing materials from flexible graphite have been indicated.

In one group of solutions to the problem, a substrate of a sufficiently high tensile strength is used, which is finished with a coupling agent, e.g. an adhesive, the substrate is covered with expanded graphite and the expanded graphite and the substrate are pressed together. It is possible to use metal wires, synthetic or natural fibers or yarns, woven fabrics and foils of various types as the substrates. The ropes or bands which are thus obtained are then optionally once more additionally reinforced with yarns, fibers or wires, e.g. by being surrounded by a knitted or braided fabric, or in some other manner and are further processed by using the known processing methods such as braiding into initial products for packings (European Patent Application 0 388 481 A1, corresponding to U.S. Pat. No. 4,961,988; and European Patent 0 466 923 B1, corresponding to U.S. Pat. No. 5,370,405).

In another group of solutions, use is made of graphite foils which have been cut into strips. In that regard, European Patent 0 253 031 B1, which corresponds to U.S. Pat. No. 4,705,722, describes the superimposition of bands of flexible graphite having a width of not more than 5 mm, which are then surrounded by a braided or knitted fabric made from a fibrous material. The strands which are thus obtained are then further braided into plaits, which are suitable as an initial material for the manufacture of packings. According to European Patent 0 466 923 B1, which corresponds to U.S. Pat. No. 5,370,405, graphite foil strips having a width of not more than 5 mm are joined through the use of adhesives to reinforcing organic, inorganic or metal filaments. The reinforced foil strips are processed by braiding, etc. into plaits and the plaits are once more surrounded by a reinforcing fiber braided fabric before being further processed into packings. European Patent Application 0 681 125 A1 discloses the cutting of wide rolls of graphite foils into rolls of reduced width. The foil bands which are thus obtained are provided with a transversely extending embossing or fluting, fluted foil bands are cut into comparatively narrow strips around 2 mm in width, and narrow, fluted strips are combined into a rope and surrounded with a reinforced fiber braided fabric. According to European Patent 0 340 303 B1, which corresponds to U.S. Pat. No. 5,240,769 and U.S. Pat. No. 5,134,030, strips of graphite foil cut to a width of not more than 5 mm are covered with organic, inorganic or metal yarns, fibers or foils and thereby reinforced. Reinforced graphite foil strips are additionally equipped with a further reinforcement of fibers in the course of further processing into braidable or twistable packing yarns.

A plurality of strips of graphite foil may also be superimposed and processed with that technical solution. According to European Patent Application EP 0 794 367 A2, graphite foil bands having a width of more than 6 mm may be reinforced with a plurality of agents, such as wires, bands, yarns of inorganic, metal or organic agents, and then braided into packing cords or plait. There too, the graphite foils may be reinforced by a surface coating of plastic material or by laminating with a plastic material. However, a width of the graphite foil bands, which are provided for braiding or knitting, of more than 5 mm is disadvantageous, as is evident from the disclosures of European Patent EP 0 253 031 B1 or European Patent 0 340 303 B1. Such foils are difficult to process and they produce packing cords of a less dense structure.

For that reason, folding techniques are preferentially used when processing wider bands and layers of graphite foils.

For instance, European Patent Application 0 444 456 A1 teaches that individual foil bands or a plurality of superimposed foil bands are folded at right angles to their longitudinal direction and a packing ring may be obtained from the folded formed body either directly or after the folded formed body has been surrounded by a braided fabric of yarns, fibers or wires. Prior to folding, the foil bands may additionally be combined with yarns, fibers or woven fabrics or such reinforcing agents may be placed between the foil layers prior to folding, for reinforcing purposes. An insertion of corrosion-resistant plastic foils which preferably additionally have sliding properties, such as e.g. polytetrafluoroethylene foils, is also described. However, such plastic foils are not used for reinforcement purposes. According to U.S. Pat. No. 5,605,341 and U.S. Pat. No. 5,549,306, wide graphite foil bands are folded along their longitudinal direction into the shape of an S or a spiral, with it being possible to insert fiber reinforcements prior to or during folding. The strands which are thus obtained are then additionally surrounded by fibers for further reinforcement by braiding or knitting to render them suitable for the manufacture of packings. U.S. Pat. No. 5,225,262 teaches embossing longitudinal profiles in graphite foils and the graphite foils which are thus prepared are folded at least once parallel to the course of the longitudinal profiling. The folded, formed bodies are then surrounded by a yarn, preferably made of INCONEL, using e.g. a braiding or knitting technique, and then calibrated. The strands that are thus produced are then braided into a packing cord, which is calibrated and then once more surrounded by a braided fabric made from a temperature-resistant, high-strength yarn. UK Patent Application GB 2 285 067 A discloses placing graphite foil webs, which may be coated with adhesive, in a plurality of superimposed layers and at least one of the surfaces of such a layered structure is covered with fibers or yarns, which extend parallel to the longitudinal extension of the layered structure and do not cross. The foil layered structures covered with fibers are then cut parallel to the fibers or yarns into strips, and ropes which are thus obtained are folded or rounded in such a way as to produce a strand, that includes a graphite foil core with an outer covering of fibers or yarns running parallel in longitudinal direction. The outer reinforcement with fibers or yarn is intended to prevent wearing-down of the foil graphite when pressure is applied.

European Patent Application 0 601 670 A1 teaches a further method of manufacturing packing yarns or packing bands using graphite foil bands. There, graphite foil bands are initially provided at one of their surfaces with an adhesive layer, to which a yarn with a reinforcing effect is applied.

The graphite foil band provided with the reinforcing yarn is then drawn through a conically tapering nozzle and subsequently pressed flat between two rollers. During that operation, the band is first rounded and then formed, with simultaneous binding-in of the reinforcing yarn and bonding together of the inner-lying surfaces of the graphite foil, into a braidable band which may then be processed into initial products for the manufacture of packings or directly into packings. Application of the adhesive may be effected through the use of a foil which is coated on both sides with adhesive. However, the foil is not used for reinforcement purposes.

In the previously described solutions for manufacturing packing yarns, packing cords, packing bands or packings, either fibers for reinforcing the graphite foils and/or graphite foil bands, which have a low tensile strength, or combinations of fiber reinforcements and foils, are used.

The purposeful application and frictional connection of fibers onto the graphite foil is comparatively difficult and the process of surrounding the outside of graphite foils or graphite foil bands with braided fabric is comparatively costly and in almost every case it is necessary to incorporate at least two reinforcements into the graphite foil bands in order to give them an adequate tensile strength and lend the resulting packing rope good functional properties. When a reinforcement of the graphite foil bands using foils made of different materials is selected, either an additional reinforcement through the use of yarns, fibers or wires or, as in the case of European Patent Application EP 0 794 367 A2, the use of graphite foil bands having a width of 6 mm or more, is necessary.

SUMMARY OF THE INVENTION

It is accordingly an object of the invention to provide a packing yarn made of graphite foil and plastic foil and a method of manufacturing a packing yarn, which overcome the hereinafore-mentioned disadvantages of the heretofore-known products and methods of this general type and in which the packing yarn is predominantly made of deformable graphite, does not contain fibers, yarns or wires as reinforcing material, has a high resistance to tearing, is eminently suitable for processing into packings using all conventional methods, including twisting, braiding and knitting methods, and may be manufactured in a minimal number of easy process steps.

With the foregoing and other objects in view there is provided, in accordance with the invention, a packing yarn, comprising at least two bands each having a width of at most 5 mm, the bands formed of a laminate, and the bands joined to one another by a yarn manufacturing method; the laminate formed of two mutually joined layers of alternately disposed laminar materials; the layers including a top layer and a bottom layer with outer flat sides; and the layers including at least one first layer of flexible graphite having a thickness of at most 1 mm and a bulk density in the region of 0.7 to 1.8 g/cm$^3$, and at least one second layer of a reinforcing agent formed of a plastic foil having a tensile strength of at least 25 MPa and an elastic modulus of at least 0.4 GPa. Both of the top and bottom layers with the outer flat sides are formed of flexible graphite, or one of the top and bottom layers with the outer flat sides are formed of flexible graphite, or none of the top and bottom layers with the outer flat sides are formed of flexible graphite.

With the objects of the invention in view there is also provided a packing yarn, comprising at least two bands each having a width of at most 5 mm, the bands formed of a laminate, and the bands joined to one another by a yarn manufacturing method; the laminate formed of at least one layer of flexible graphite having two flat sides, and at least one layer of reinforcing agent joined to at least one of the two flat sides; the at least one layer of flexible graphite having a thickness of at most 1 mm and a bulk density in the region of 0.7 to 1.8 g/cm$^3$; and the at least one layer of reinforcing agent formed of a plastic foil with a tensile strength of at least 25 MPa and an elastic modulus of at least 0.4 GPa.

The at least two bands of the laminate, which are to be joined together into a packing yarn, preferably have a flat configuration and are non-twisted. However, at least one of them may be separately twisted, prior to the processing into a packing yarn.

With the objects of the invention in view, there is additionally provided a method of manufacturing a packing yarn, which comprises joining at least one of two flat sides of at least one flexible graphite layer to at least one plastic foil layer of a reinforcing agent having a tensile strength of at least 25 MPa and an elastic modulus of at least 0.4 GPa to form a foil composite laminate, in a first step; cutting the foil composite laminate into at least two bands at most 5 mm in width, in a second step; processing at least two of the bands obtained after the second step into a yarn by using a textile processing method, in a third step; and calibrating the yarn obtained after the third step into a cross-sectional shape selected from the group consisting of round, elliptical, oval and rectangular.

With the objects of the invention in view, there is also provided a method of manufacturing a packing yarn, which comprises alternatingly superimposing and joining at least one plastic foil layer of a reinforcing agent having a tensile strength of at least 25 MPa and an elastic modulus of at least 0.4 GPa, on at least one flat side of at least two flexible graphite layers, in a first step, to form a foil laminate composite having each of the flat sides of the graphite layers inside the laminate composite joined to a plastic foil layer; cutting the foil laminate composite into at least two bands at most 5 mm in width, in a second step; processing at least two of the bands obtained after the second step into a yarn according to a textile processing method, in a third step; and calibrating the yarn obtained after the third step into a cross-sectional shape selected from the group consisting of round, elliptical, oval and rectangular. The method also comprises providing the laminate composite with top and bottom layers having outer flat sides, placing none, one or both of the flexible graphite layers at the outer flat sides, and joining none, one or both of the outer flat sides to a plastic foil.

In accordance with another feature of the invention, the packing yarn according to the invention is composed of two or more than two bands, preferably of 2 to 5 bands, which are joined together into a yarn or a strand using textile processing methods such as, for example, braiding, knitting, weaving or twisting. Twisting is preferred due to its simplicity and the low cost associated with achieving a good product quality. The number of bands which may be combined into a packing yarn is limited in an upward direction by the working method which is used. Generally, up to 12 bands are combined by twisting into a packing yarn. Preferably, however, 2 to 5 bands are twisted together. The number of bands, which are to be combined into a packing yarn, also depends upon the width and the thickness of the bands.

In accordance with a further feature of the invention, the width should not exceed 5 mm if high-quality packing yarns are to be obtained. For most processing methods and applications, band widths of not more than 3 mm and thicknesses of not more than 2 mm have proved successful. When particularly thin or flexible packing yarns are to be manufactured, the use of bands having a width of not more than 2 mm and a thickness of not more than 1 mm is recommended. The specified ratios of width to thickness represent advantageous band cross sections.

A link between such values for all bands does not exist. In extreme cases, bands having a width of 5 mm and a thickness of below 0.35 mm may also be used. If they are to be capable of being processed using one of the previously described methods at all, the bands are required to have a specific minimum tensile strength and they are also required to have a suitable tensile strength for further processing into packing yarns, packing cords, packing plaits or into packings. They are also required to lend the packings manufactured from them specific properties, more details of which will be provided below. Since the graphite foils alone and the bands which may be manufactured from graphite foils alone have a totally inadequate tensile strength and resistance to tearing, the tensile strength of the bands of a laminate, which are described in the context of the present invention, is determined by the tensile strength of the plastic foils joined to the graphite foils. In order to provide bands, which are to be suitable for further processing into packing yarns, the inventors have discovered that it is not enough to use just any plastic foils. Rather, for the purpose of the invention, it is necessary to select plastic foils which have a specific minimum tensile strength and a specific minimum elastic modulus and may be joined in some manner to the graphite foil. The tensile strength of the plastic foils should therefore be at least 25 MPa and the elastic modulus at least 0.4 GPa.

In accordance with an additional feature of the invention, the foils have a tensile strength of at least 50 MPa and an elastic modulus of at least 1 GPa.

In accordance with yet another feature of the invention, in order to provide packing cords of a particularly high tensile strength, the tensile strength is at least 140 MPa and the elastic modulus at least 2.5 GPa. In order to avoid slippage, shrinkage and degradation processes during use of the packings and seals under extreme operating conditions such as high temperatures and under corrosive conditions and possibly under high sealing pressures, for which indeed graphite packings and graphite seals are particularly suitable, it is important to keep the plastic foil content as low as possible.

Therefore, in accordance with yet a further feature of the invention, the thickness of the plastic foils in the packing cord is limited to 50 $\mu$m, and is preferably 30 $\mu$m and less. The graphite foils, which are used to manufacture the laminate and the bands made from the laminate, should not have too loose a structure, nor should they be too stiff. If they were too loose or not sufficiently mechanically stable, even when combined with the plastic foils in the laminate bands, they would have too strong a tendency to crumble. If they were too stiff, they would not be flexible enough for processing and use. If they are to remain sufficiently flexible, they should also not be too thick. For this reason, their thickness is limited to at most 2 mm and preferably to less than 1 mm and their bulk density is limited to the region of 0.7 to 1.8 $g/cm^3$ and preferably to the region of 1.0 to 1.4 $g/cm^3$. The laminate bands from which the packing yarn is manufactured, are to be not wider than 5 mm and preferably not wider than 3 mm so that they may be processed with one another without difficulty using the previously described textile methods, in particular twisting or braiding. For specific applications, widths of 2 mm and less are also advantageous.

In order to guarantee the high temperature stability of the packing yarns and prevent corrosion of the materials lying adjacent the packings made of the packing yarns according to the invention, the flexible graphite in the packing yarns should only have a low impurity content. In accordance with yet an added feature of the invention, the carbon content of the graphite foils is generally to be at least 96% by weight and preferably at least 99% by weight.

The bands, from which the packing yarns are manufactured by using textile methods, may include one layer of graphite foil and one layer of a plastic foil which is joined to this graphite foil. It is, however, often more advantageous to combine more than one layer of flexible graphite with more than one layer of plastic foil to form a laminate. In such a laminate, each layer of graphite foil is followed by a layer of plastic foil and all of the foils are joined to one another.

The number of foils which are superimposed depends upon the respective practical conditions and the manufacturing cost. Generally, no more than six graphite foils are combined in a suitable manner with plastic foils to form a laminate. Preferred laminates contain 2 to 4 graphite foils. The outer flat sides of the graphite foils of the laminates may be free of any covering. However, one or both of such two flat sides may carry a plastic foil and be joined thereto. Which of the three variants is selected depends upon the intended subsequent use of the packing manufactured from the packing yarns.

In accordance with yet an additional feature of the invention, a top and/or bottom covering of the outer flat sides of the outer-lying graphite foils of the laminate and of the bands manufactured from the laminate, is preferably foils from the group of perfluorinated polymeric hydrocarbons, in particular polytetrafluoroethylene, tetrafluoroethylene-perfluoropropylene copolymer. Foils of such materials have an excellent chemical resistance, good temperature resistance and excellent sliding properties.

They therefore fit extremely well into the performance spectrum of flexible graphite and prevent sticking of the graphite packings to the materials which restrict the packing space. Where it seems appropriate, the flat sides of the graphite foils lying on the outside of the laminate may also be covered with other polymer foils.

In accordance with again another feature of the invention, all plastic foils which meet the previously described tensile strength and elastic modulus conditions and may be joined to the graphite foils are suitable as reinforcing foils.

Preferred plastic foils of such type are formed of polyimide, polyester or they are plastic materials from the group of perfluorinated polymeric hydrocarbons. Particularly good tensile strengths of the bands may be achieved through the use of foils of stretched polytetrafluoroethylene as a reinforcing material.

In accordance with again a further feature of the invention, the plastic foils may be joined to the graphite foils through the use of adhesives or without the use of adhesives. The decision as to which of the possible joining methods is selected in each individual case has to be made by the person skilled in the art through the use of experiments that are easy to conduct. All adhesives which wet the surfaces of the graphite foils and plastic foils may be used. However, the joining strength achieved through adhesion is required to be at least high enough to guarantee processing of the laminate produced by adhesion into bands and further processing of the bands into the packing yarns. It is possible, for example, to use acrylate-based, polyamide-based, polysiloxane-based and polyurethane-based adhesives and acetylated organic polymers as well as epoxide resin adhesives and phenolic resin adhesives.

In accordance with again an added feature of the invention, adhesive-free joining of the graphite foils to the plastic foils may be achieved at temperatures approaching or within the softening range of the plastic foils and while simultaneously applying a moderate contact pressure of at least 0.1 MPa and preferably of 0.5 to 6 MPa. Polyester, polyamide and fluoropolymer foils may be welded to the graphite foils in this way.

The graphite foils may also be joined to the plastic foils with the aid of the method according to European Patent Application 0 616 884 A2, which operates without the use of adhesives and instead uses a special coupling agent. In the context of the present invention, such a method of joining the graphite foils to the plastic foils is also to be regarded as an adhesive-free method.

In accordance with again an additional feature of the invention, the packing yarns, which are obtained through the use of a textile processing method such as, for example, the braiding or, in particular, twisting of two or more laminate bands, may be further processed directly into packings. They may, however, alternatively be further processed e.g. by twisting or braiding first into packing cords, from which packings are then manufactured using known methods. Instead of using laminate bands having substantially flat surfaces for yarn manufacture, such bands having flat surfaces may first each be individually twisted prior to being twisted or braided together, and then such already individually twisted bands may be processed, either on their own or in combination with non-twisted bands, into packing yarns. Since, after the packing yarns have been manufactured e.g. by twisting or braiding, the surface thereof is not uniform enough for most applications, the packing yarns are additionally calibrated prior to further processing.

In accordance with still another feature of the invention, during such operation, which may be effected by one of the known apparatuses, the packing yarns and the laminate bands therein are further compressed and the packing yarns are given the cross section which is required or desired for the subsequent application and which is preferably round, elliptical, oval, rectangular or square.

There follows a further description of the invention with the aid of exemplary embodiments:

EXAMPLE 1

A 500 mm wide, 50 m long and 0.2 mm thick graphite foil having a bulk density of 1.2 g/cm$^3$ was uniformly coated at one of its flat sides in a quasi-continuous process in a laminating machine (manufactured by: Billhofer Maschinenfabrik, Nuremberg, Germany) through the use of an adhesive spreading roller and a doctor blade with an aqueous two-component acrylate adhesive, which contained the prescribed quantity of hardener (adhesive and hardener manufactured by Morton International GmbH, Bremen, Germany). The graphite foil web coated with the hardener-containing adhesive was then totally covered in the same installation by a likewise 500 mm wide and 12 μm thick polyester foil (Mylar, type A, supplier: Du Pont Electronics, Geneva, Switzerland), conveyed over a hardening roller set to a temperature of around 70° C. and then bonded to the polyester foil web through the use of a setting roller.

The above-described laminating operation was repeated, in each case using the previously manufactured laminate web alternating with further layers of graphite foil and polyester foil until, as an end product, a laminate web having a total length of 50 m, a width of 500 mm and a total thickness of 0.9 mm was obtained having the following sequence of joined layers: 1. graphite foil, 2. polyester foil, 3. graphite foil, 4. polyester foil, 5. graphite foil, 6. polyester foil, 7. graphite foil. This laminate web was then divided into narrow strips around 1.5 mm in width. To this end, the 500 mm wide web was cut firstly on a longitudinal cutting machine (manufactured by: HSM, Bad Oeynhausen, Germany) into 50 mm wide bands and then on a cutting machine having cutting cylinders (manufactured by JOMRO Textiltechnik GmbH, Eschwege, Germany) into bands approximately 1.5 mm wide. Corresponding methods were also used in the following exemplary embodiments to produce narrow laminate bands. In each case, three of these 1.5 mm wide bands of the laminate were twisted on a laboratory twisting configuration into a yarn in such a way that the yarn had around 40 turns per meter of yarn length. The yarns that were thus manufactured, which still had an uneven surface, were then passed through a calibrating apparatus with a round cylinder cross section. Flexible packing yarns of high tensile strength having a diameter of 2.3 mm were obtained, which were suitable for the manufacture of packing cords by twisting or braiding or directly for the manufacture of packings using one of the known methods. Tensile strength tests on the finished, 2.3 mm diameter yarn, in a sample length of 800 mm, a free clamping length of 200 mm and a drawing-off speed of 50 mm/min, produced a tensile strength of 9.3 MPa. In order to conduct the tests, a tensile testing machine manufactured by Zwick, Ulm, Germany, using grip heads of the type 8314 (manufactured by: Zwick), was employed.

This method of determining the tensile strength of the yarns was also used for the yarns described with respect to the following exemplary embodiments. In order to determine the weight loss and the heat resistance, portions of such a yarn were exposed for an hour to hot air at a temperature of 300° C. in a forced-air oven. Afterwards, the weight loss was 1.5%.

EXAMPLE 2

In this example, the same number of graphite foils of the same dimensions and the same quality were laminated with the same number of polyester foils of the same dimensions and the same quality as in Example 1. Unlike the procedure according to Example 1, the various foils were joined together in accordance with the method described in European Patent Application 0 616 884 A2. For this purpose, first, in separate working steps each of the graphite foils was drawn by using a dipping process through the solution of a coupling agent being formed of a mixture of a siloxane and a fatty alcohol (purchasing source: Wacker Chemie GmbH, Munich, Germany), the quantity of coupling agent substance clinging to the surface was reduced by wiping the elements to the required extent and then drying was performed with radiant heaters. After drying, the graphite foils were rewound onto rollers. In order to join the four graphite foils to the three polyester foils, the foils were withdrawn synchronously from a stand, which had a total of seven rollers (four graphite foil rollers and three polyester foil rollers), in such a way that the foils were fully superimposed in the following order: 1. graphite foil, 2. polyester foil, 3. graphite foil, 4. polyester foil, 5. graphite foil, 6. polyester foil, 7. graphite foil. The foil webs that were thus superimposed, having the graphite foils which were coated with coupling agent, were conveyed for joining through a double band press. The press temperature was 170° C., the pressing force (pad pressure of the press) was a constant 30 bar and the throughput rate was 2 m/min. The thickness of the laminate web after pressing was 0.8 to 0.9 mm. The laminate web was longitudinally split in two stages into bands in the manner described in Example 1. The finally produced bands had a width of 2.5 mm and a thickness of 0.8 to 0.9 mm. In order to manufacture a packing yarn, in this example two of the rectangular bands were twisted together into a yarn having around 50 turns per meter of yarn length and the yarn was then calibrated to a diameter of 2.5 mm.

The packing yarn that was obtained was flexible and was capable of being twisted or braided into packing cords and also of being processed into wound packings without difficulty. The tensile strength of this yarn, which was determined as in Example 1, was 8.6 MPa. The advantage of this packing yarn is the lower material loss of only 0.6% after treatment for one hour at 300° C. in air in the forced-air oven.

EXAMPLE 3

Using the laminating machine described in Example 1, a 280 mm wide and 0.38 mm thick graphite foil, which had a bulk density of 1.1 g/cm$^3$, was first coated on one side with a polyamide-based adhesive (AQ-Nylon, supplier: Toray, Japan) and then bonded over its entire surface with a 280 mm wide and 50 μm thick polyimide foil (KAPTON HN 200, manufactured by Du Pont). The process was then repeated in order to join a further, identical graphite foil to the previously manufactured laminate of polyimide-foil and graphite foil in such a way as to produce a laminate web having the structure: graphite foil-polyimide foil-graphite foil. This laminate web had a total thickness of around 0.8 mm. In order to produce narrow bands from this web, the latter was longitudinally split using the method described in Example 1 in such a way that 2 mm wide individual bands of the laminate were finally obtained. In order to manufacture a packing yarn, four of such individual bands were twisted together in such a way that the resultant packing yarn had around 40 turns per running meter. After twisting, the packing yarn was additionally calibrated to a diameter of 3.0 mm. The tensile strength of the packing yarn was 8.0 MPa. After treatment of the packing yarn for one hour in the forced-air oven in air at 300° C., a material loss of 0.4% was measured.

The packing yarn was flexible and capable of being processed by all conventional methods into packing cords and packings.

EXAMPLE 4

In this exemplary embodiment, once again a laminate web was manufactured, which was formed of two graphite foils having a thickness of 0.38 mm and a bulk density of 1.1 g/cm$^3$ and a polyimide foil of KAPTON KJ (manufacturer: Du Pont), which was situated between the two graphite foils. The polyimide foil had a thickness of 25 μm. In that case, however, the joint between the individual foil layers was produced without the use of an adhesive or coupling agent, solely by welding the polyimide foil to the graphite foils. To this end, the fully superimposed foils were conveyed through a double band press at a temperature of 380° C. (pad temperature) under a pressure of 30 bar at a throughput rate of 0.5 m/min. The further processing of the laminate web thus manufactured into packing yarns was effected as in Example 3. The tensile strength of the packing yarn was 4.1 Mpa and its material loss after treatment for one hour in air heated to 300° C. in the forced-air oven was advantageously below 0.1%. The packing yarn was flexible. Its tensile strength was still sufficient to allow its further processing into packing cords and packings.

EXAMPLE 5

In the case of this exemplary embodiment, two graphite foils having a width of 280 mm, a thickness of 0.25 mm and a bulk density of 1.0 g/cm$^3$ were joined to a 280 mm wide, 50 μm thick polyimide foil of KAPTON HN 200 (manufacturer: Du Pont), which was situated between the graphite foils, in accordance with the method according to European Patent Application 0 616 884 A2. To this end, the polyimide foil was drawn through a bath of a coupling agent solution being formed of a siloxane-fatty alcohol mixture (supplier: Wacker Chemie, Munich, Germany) and the coupling agent adhering to both sides of the polyimide foil was spread by doctor blades and distributor rolls uniformly into a thin layer on the surfaces of the plastic foil and then the surfaces of the plastic foil were dried through the use of radiant heaters. The two graphite foils were then fed in such a way that they fully covered both sides of the polyimide foil. The foils, which were not yet firmly joined to one another, were then heated through the use of heating tiles up to around 200° C. and then passed through three roller pairs, which were set to a temperature of around 180° C. The roller pressure acting upon the laminate web in this case was adjusted in such a way that the finished laminate web had a thickness of 0.4 mm. The laminate web was then cut longitudinally, in the manner already described in the previous examples, into bands having a width of 1.5 mm. In each case, six of the laminate bands that were thus manufactured were twisted into a yarn and this yarn was then calibrated to a diameter of 2.2 mm. The tensile strength of this yarn was 14.7 MPa. Its material loss after treatment for one hour in hot air at a temperature of 300° C. in the forced-air oven was 0.35%. The yarn was still sufficiently flexible. It was capable of being twisted and braided into packing cords and also of being processed directly into packings without difficulty.

EXAMPLE 6

A foil of unidirectionally stretched polytetrafluoroethylene having a width of around 300 mm and a thickness of 30 μm (experimental product of Nitto Denko, Japan) was disposed between two graphite foils, having a width of 300 mm, a thickness of 0.2 mm and a bulk density of 1.2 g/cm$^3$, in such a way that the foils were in contact over their entire surface.

The foils thus disposed were then welded to one another in accordance with the method described in principle in Example 4 using a double band press. The pads of the press had a temperature of 380° C., the pressing force was 30 bar and the throughput rate of the superimposed foils was 1 m/min. The laminate web thus obtained was then longitudinally cut into 1 mm wide laminate bands in the manner described in the previous examples. In each case, seven of the bands that were thus obtained were twisted into packing yarns having 50 turns per running meter of packing yarn. The tensile strengths of these packing yarns were around 10.5 MPa. Their material loss after treatment for one hour in air at a temperature of 300° C. in the forced-air oven was less than 0.1%. The packing yarns of that type were highly flexible. They lent themselves very well to processing into packing cords and packings.

EXAMPLE 7

The laminate web described herein was formed of a graphite foil having a thickness of 0.5 mm, a width of 1430 mm and a bulk density of 1.0 g/cm$^3$, which was joined by welding over the entire surface of each of its two flat sides to a polytetrafluoroethylene foil TFM 1700 (manufacturer: Dyneon, Burgkirchen, Germany) having a width of 1430 mm and a thickness of 50 μm. Welding was effected in accordance with the method which was described in principle in Examples 4 and 6. In the present example, a pad pressure of 30 bar, a pad temperature of 380° C. and a throughput rate of 3.5 m/min were used. The laminate web obtained after welding was cut longitudinally into laminate bands having a width of 2 mm.

Then, in each case, four of such laminate bands were combined and twisted in such a way that the packing yarn thus obtained had 35 turns per running meter of packing yarn. This packing yarn was then calibrated to a diameter of 2.5 mm. The packing yarn had a tensile strength of 16 MPa and a material loss after treatment for one hour in air at 300° C. in the forced-air oven of less than 0.1%. By virtue of its flexibility and tensile strength it was capable of being twisted or braided into packing cords or processed directly into packings without difficulty, like the other packing yarns described in Examples 1 to 7.

There now follows a description of the general course of manufacture of a packing yarn with reference to a diagram shown in Table 1:

TABLE 1

Diagram illustrating the method
of manufacturing packing yarns

Stage I

Unwind Foils
Coat foils with adhesive or coupling agent[1]
Superimpose foils
Join foils to form a laminate
(pressure + optionally temperature)
variant 1: join by an adhesive
variant 2: join by a coupling agent in accordance
with European Patent Application 0 616 884 A2
variant 3: join by welding Stage II Cut laminate into bands Stage III Use textile method to process bands into packing yarns
Calibrate packing yarn

[1]This process step is omitted in the case of variant 3, "join by welding" for effecting the process step "join foils to form a laminate"

Generally, the course of manufacture includes three stages: in a first process stage a laminate is manufactured from which, in a second process stage, bands are produced which, in a third process stage, are processed into a packing yarn.

In the first process stage, layers of graphite foil regularly alternating with layers of the reinforcing plastic foil are superimposed in such a way that the layers of the various types of foil always completely cover one another.

Alternatively, however, only one layer of graphite foil may be joined to only one or to two layers of plastic foil.

Advantageously for this purpose, the plastic foils and the graphite foils are unwound from rollers and, without being cut into pieces of a specific length, are further processed in a continuous process. They may, however, alternatively be cut into webs of a specific length and further processed discontinuously or quasi-discontinuously into packing yarns. However, the last method is used more rarely.

The foils may be joined together through the use of adhesives or in accordance with the method according to European Patent Application 0 616 884 A2 or by welding. Where the foil layers are to be joined to one another through the use of an adhesive, before superimposition at least one of the two foil surfaces, which are to be joined together, has to be provided with the adhesive. The adhesive has to be applied as thinly as possible onto the surfaces. Suitable adhesives are preferably adhesives from the group of acrylates, polysiloxanes, polyurethanes, polyamides, acetylated organic polymers, epoxide resins and phenolic resins. In order to perform the joining, the foil sandwich is subjected to a pressure of at least 0.1 MPa and of at most 5 MPa and, given the use of thermally hardenable adhesives, additionally to the required temperature for hardening where joining is to be effected using the method in accordance with European Patent Application 0 616 884 A2, a substance acting as a coupling agent is applied onto at least one of the foils to be joined. During application, however, care has to be taken to ensure that the substance acting as a coupling agent is applied in a very thin layer and spread particularly evenly. The joining itself is effected with that method under a pressure of at least 0.5 MPa and at a minimum temperature of 130° C. In the case of welding, the layers to be joined are joined under the required temperature and pressure conditions, without coating the surfaces to be joined with an adhesive or coupling agent.

When joining the graphite foils to the polyester foils, temperatures in the range of 240 to 270° C. and a pressure of at least 0.1 MPa, preferably of 3 MPa, are used. When the graphite foils are to be joined to plastic foils from the group of polyimide and perfluorinated polymers, temperatures in the range of 350 to 380° C. and a pressure of at least 0.1 MPa, preferably of 2 to 3 MPa, are required. In the simplest case, only one layer of graphite foil is joined at one or at both of its flat sides to a plastic foil. Preferably, however, more than one layer of graphite foils are joined to more than one plastic foil to form a laminate. The plastic foils being used are required to have a tensile strength of at least 25 MPa and an elastic modulus of at least 0.4 GPa.

The laminates manufactured in process stage 1 are cut longitudinally in process stage 2 by cutting devices such as, for example, cutting cylinder sets, into laminate bands of a width required for further processing in process stage 3.

The bands thus manufactured may be either further processed directly in a continuous process or they may be wound, individually or combined into a group, onto bobbins.

In process stage 3, the bands manufactured in process stage 2 are processed into packing yarns using one of the known methods. Preferably, use is made in this case of a twisting method. However, where necessary, braiding or another method may be used. The raw packing yarns still have a comparatively uneven surface. In order to smooth the surface and further compress the yarns, the latter are additionally calibrated to a specific cross section in most cases. It is, wever, also possible to effect further processing of non-librated packing yarns.

Other features which are considered as characteristic for the invention are set forth in the appended claims.

Although the invention is illustrated and described herein embodied in a packing yarn made of graphite foil and plastic foil and a method of manufacturing a packing yarn, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
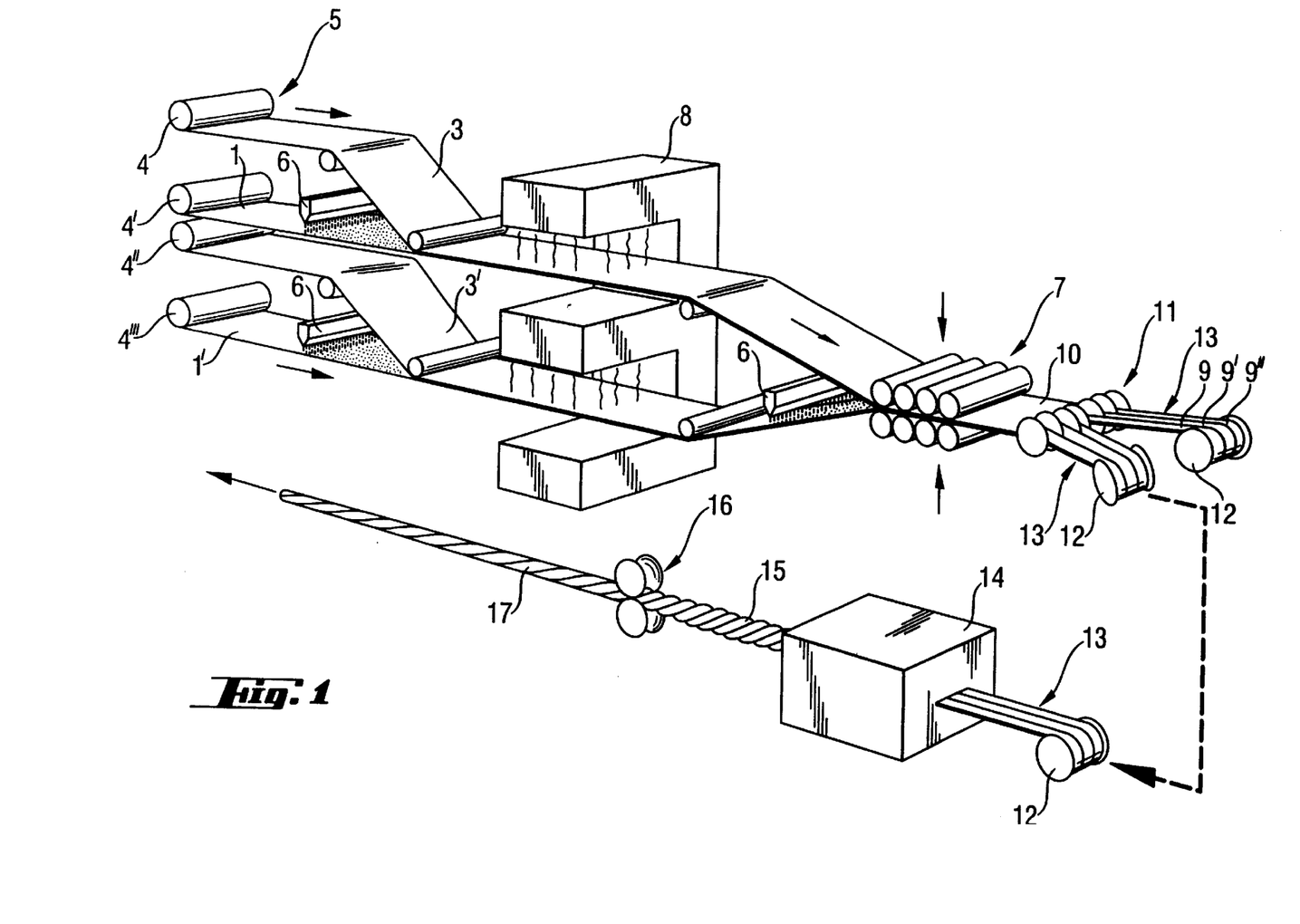
FIG. 1 is a diagrammatic, perspective view illustrating a continuous or partially continuous method of manufacturing packing yarns according to the invention.

Referring now to the figures of the drawings in detail and first, particularly, to FIG. 1 thereof, there is seen a preferably used continuous or partially continuous method, in which graphite foils 1, 1' and plastic foils 3, 3' that are to be joined together are simultaneously unwound by rollers 4, 4', 4", 4'", which are suitably disposed in a roller stand 5, in such a way that the foils 1, 1', 3, 3' may be precisely superimposed and joined to one another. Where the joining is to be effected by adhesion or by a method according to European Patent Application 0 616 884 A2 then, prior to superimposition of the foils 1, 1', 3, 3', at least one of two surfaces to be joined to one another has to be provided in each case with a thin coating of adhesive or coupling agent. This may be effected, for example, by spraying or wiping devices 6 or by coating rollers or by combinations thereof. Where the consistency of the adhesive or coupling agent allows, application may alternatively be effected by dipping. In the case of joining through welding, such coating apparatuses are not needed. Joining is effected at roller frames 7 or band presses which, where necessary, are either self-heatable or have an upstream heating device 8 such as, for example, an oven, through the use of which the foils 1, 1', 3, 3' or a sandwich structure of the foils 1, 1', 3, 3' is heated up to a required temperature for joining.

In the case of the non-illustrated manufacture of laminates composed of a higher number of graphite foils and plastic foils or in cases where it is appropriate for other reasons, it is also possible to manufacture laminates including a few foil layers in a preceding production step and then to produce the laminate intended for further processing into the bands by joining such prefabricated laminates.

In order to manufacture bands 9, 9', 9" from laminates 10 of the graphite foils 1, 1' and the plastic foils 3, 3', the respective laminate 10 is cut in the second process stage according to Table 1. The cutting is performed through the use of conventional cutting devices 11 which cut the laminates in a longitudinal direction into the bands 9, 9', 9" having the required width, which is advantageously under 5 mm. In the continuous process, that cutting operation is directly linked to the preceding process of manufacturing the laminate 10 from the foils 1, 1', 3, 3'. For practical reasons, the splitting of the laminate webs into bands of the width required for manufacture of the yarns may be effected in two stages, particularly in the case of laminates of greater width. First, the laminate web is split into widths of medium size and then the webs of medium width are cut to the desired final width of the bands. This last method is not illustrated in FIG. 1. Cutting is effected by conventional cutting devices 11, preferably continuously with the aid of cutting cylinders. The bands 9, 9', 9" which are thus produced are either each wound individually onto bobbins 12 for further processing in a subsequent, separate process step or they are combined directly in a continuous process in the third process stage according to Table 1 into the band number required for subsequent processing, in a manner that is likewise not shown in FIG. 1. This is done by a textile method, namely braiding, knitting or preferentially twisting, and then they are processed into a packing yarn 15. When the textile processing is to be effected by twisting, it is advantageous if the number of bands 9, 9', 9" required for twisting are wound onto one bobbin 12 immediately after cutting. In order to perform the twisting, it is then only necessary for a strand 13 including the specified number of bands 9, 9', 9" to be withdrawn from the bobbin 12 and twisted. Twisting is effected through the use of apparatuses 14 of the type which are used, for example, to manufacture cables or yarns.

Packings for simple functional requirements may already be manufactured from the packing yarns 15 which are thus produced. In most cases, however, the packing yarns 15 obtained after joining of the bands 9, 9', 9" by a textile method are additionally calibrated with the aid of conventional, known apparatuses 16 into packing yarns 17 having a strictly defined surface contour and a specific yarn cross section. During this process, the packing yarns 15 are additionally compressed and standardized.

Figure 2:
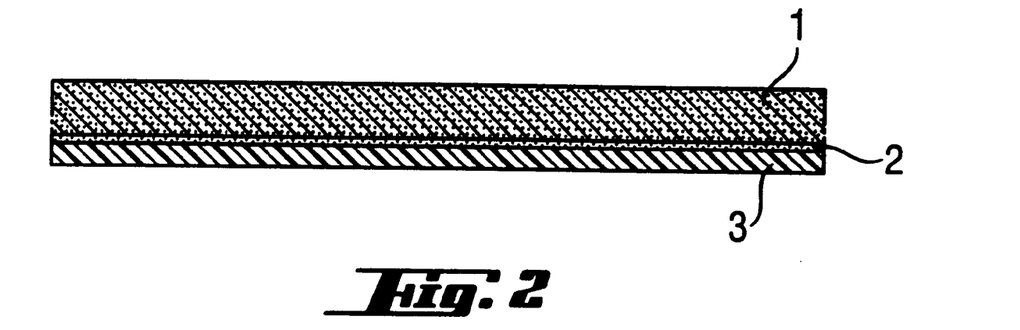
FIG. 2 is a cross-sectional view of a glued laminate band formed of a layer of flexible graphite and a plastic foil, in which a joint between the components was produced by gluing or through the use of a coupling agent.

FIG. 2 shows a cross section through a laminate band having a layer of 0.5 mm thick flexible graphite 1 with a bulk density of 1.0 g/cm$^3$, which is joined through the use of a thin layer 2 of an acrylate-based adhesive to a 12 μm thick plastic foil 3 made of polyester. According to another variant, this layer of flexible graphite 1 has been joined by the method according to European Patent Application No. 0 616 884 A2 to a 50 μm thick polyimide foil, in which a siloxane-fatty alcohol mixture has been used as a coupling agent. In this laminate, one of the flat sides includes graphite 1 and the other plastic material 3.

Figure 3:
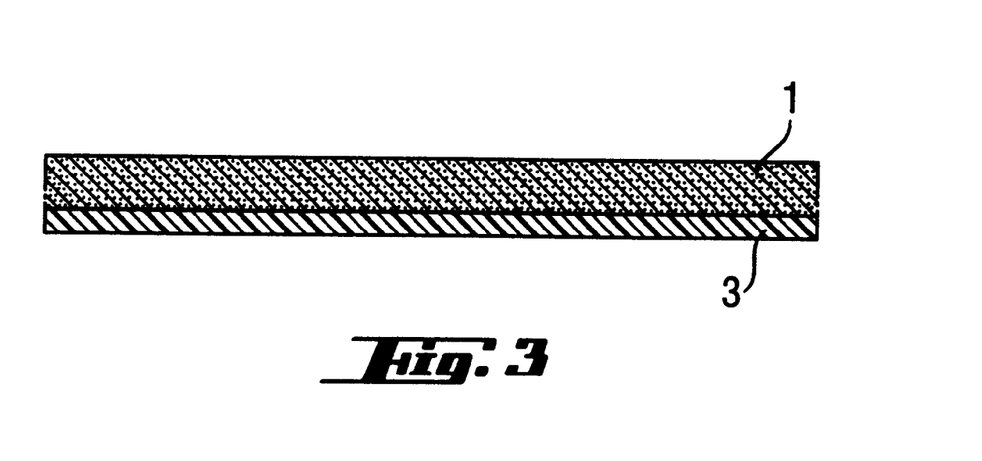
FIG. 3 is a cross-sectional view of a laminate band formed of a layer of flexible graphite and a plastic foil, in which the layer of flexible graphite and the plastic foil are welded to one another.

FIG. 3 shows a cross section through a laminate band being formed of a layer of flexible graphite 1 and a 12 μm thick polyester foil 3. A joint between the two layers 1, 3 was produced by welding without the use of an adhesive or coupling agent. A good tensile strength combined with a particularly advantageous ratio of the weight of graphite to plastic material is realized in this laminate. If, according to another possible variant of this laminate, the plastic foil 3 were made of PTFE instead of polyester, the tensile strength of the band would admittedly be slightly reduced.

However, given an equally good ratio of graphite to plastic material, the heat and chemical resistance as well as the slidability of a packing manufactured from the laminate would additionally be substantially improved. According to another exemplary embodiment derivable from FIG. 3, a corresponding laminate may include a middle layer of graphite foil 1, which has been joined at each of its two flat sides by welding to a fluoropolymer foil. However, only one of such fluoropolymer foils 3 is visible in FIG. 3.

Figure 4:
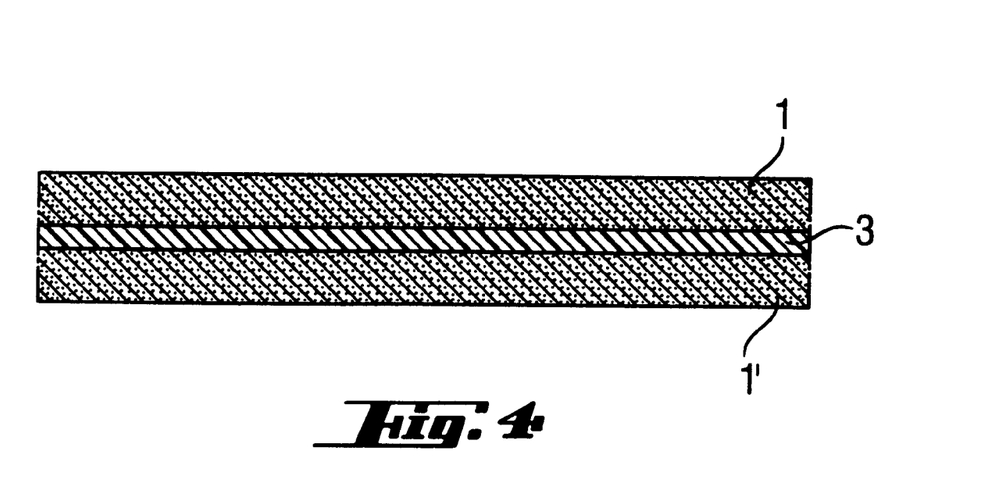
FIG. 4 is a cross-sectional view of a laminate band formed of two layers of flexible graphite, between which is situated a layer of plastic foil, that is joined to the graphite layers through the use of an adhesive.

FIG. 4 shows a cross section through a laminate band formed of a top layer 1 and a bottom layer 1' of 0.38 mm thick graphite foil having a bulk density of 1.1 g/cm$^3$. A 25 μm thick polyimide foil 3 which has been joined by welding on both sides to the graphite foils 1, 1' is situated between the top and bottom layers.

Figure 5:
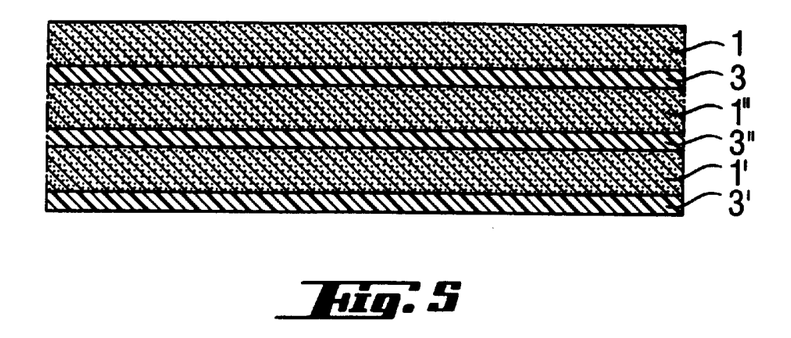
FIG. 5 is a cross-sectional view of a laminate band formed of three layers of flexible graphite and three layers of plastic foil, wherein the layers are welded to one another.

FIG. 5 shows another form of a laminate band in cross section. The band is formed of three layers of 0.2 mm thick graphite foil 1, 1', 1" having a bulk density of 1.2 g/cm$^3$ and three layers of 30 μm thick plastic foil 3, 3', 3" made of stretched polytetrafluoroethylene (PTFE). The plastic layers 3, 3', 3" have been joined by welding to the graphite layers 1, 1', 1". In this laminate, one of the outer flat sides of the outer-lying graphite foils 1, 1' is free and the other of these sides is covered with a PTFE foil 3'. Bands of this laminate have a high tensile strength. The packings manufactured from them are highly heat-resistant and chemical-resistant and they have a very advantageous mass ratio of graphite to organic components.

Figure 6:
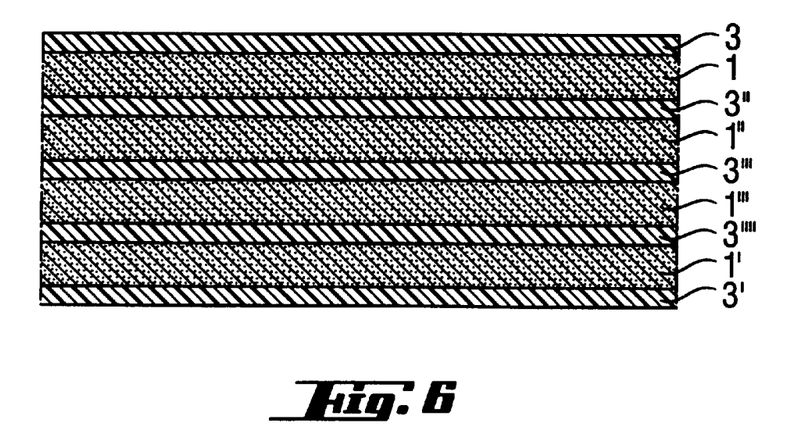
FIG. 6 is a cross-sectional view of a laminate band formed of four layers of flexible graphite and five layers of plastic foil, with outer covering layers, i.e. a top and a bottom covering layer, formed of a different plastic foil than the plastic foils situated between the graphite layers and in which the layers are welded to one another.

FIG. 6 shows a cross section through a laminate band, which is formed of four layers of 0.2 mm thick graphite foil 1, 1', 1", 1"', having a bulk density of 1.2 g/cm$^3$ and five layers of plastic foil 3, 3', 3", 3"', 3"". The laminate is covered on each side by a respective 50 μm thick plastic foil 3, 3' made of polytetrafluoroethylene TFM 1700 and joined thereto by welding. The plastic foils 3", 3"', 3"", which are disposed between the graphite layers 1, 1', 1", 1"' and are likewise welded on both sides to the latter, are 12 μm thick and made of the polyester foil, MYLAR. Besides outstanding functional properties of packings manufactured from such laminate bands, which is illustrated by the fact that they have particularly good sliding properties, reference is made in this case to a method of manufacture which is advantageous for such laminates. In a separate, preceding process step, the graphite foils 1, 1' intended for the top and bottom cover layers of the laminate are each welded at one side to a respective layer of the fluoropolymer foil 3, 3'. The graphite foils 1, 1' which are thus prepared and already coated on one side with the one type of plastic foil 3, 3' are then disposed with the other layers of a different type of plastic foil 3", 3"', 3"" and the remaining graphite foil layers 1", 1"' in the intended order and joined together. This procedure may be modified in a suitable manner and used for the manufacture of laminates of a different structure as well. It is also particularly suitable for the manufacture of laminates formed of a plurality of layers of graphite foil and plastic foil.

Figure 7:
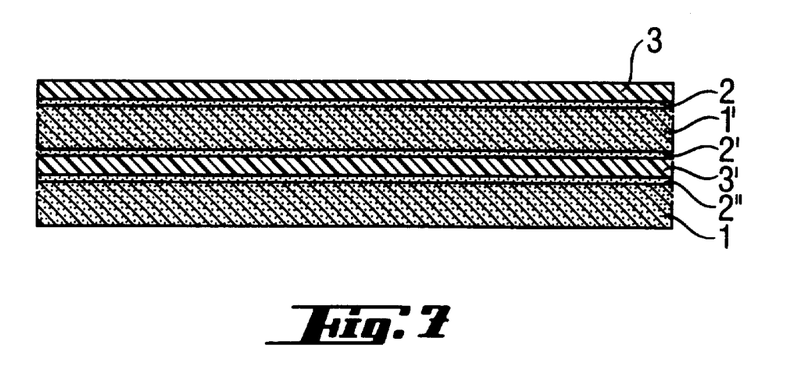
FIG. 7 is a cross-sectional view of a laminate band formed of two layers of graphite foil and two layers of plastic foil, with the layers of flexible graphite and plastic foil being joined to one another through the use of an adhesive.

FIG. 7 shows a cross section through a laminate band, which is formed of two 0.35 mm thick graphite foils 1, 1' having a bulk density of 1.0 g/cm$^3$ and two 50 μm thick plastic foils 3, 3' made of polyimide. The foil layers are joined to one another through the use of a polysiloxane adhesive 2, 2', 2". One of the outwardly directed surfaces of the two graphite foils 1, 1' is joined to a polyamide foil 3, while the other side has no covering. According to another, non-illustrated variant of the laminate, the second flat side of the graphite foil 1, which is still free in FIG. 7, might be covered with and joined to a non-illustrated plastic foil. According to a further, likewise non-illustrated variant, both outwardly directed flat sides of the graphite foils 1, 1' might also be free of plastic foils.

It is not difficult to see that many more possible laminates may be formed by modifying the exemplary embodiments indicated by FIGS. 2 to 7 according to the teaching of the invention. The invention is accordingly not limited to the exemplary embodiments illustrated in the drawings. For this reason, the present patent application is also to include the non-illustrated laminates which the person skilled in the art might manufacture and process further into packing yarns, on the basis of the information supplied to him or her by the present disclosure.

We claim:

1. A packing yarn, comprising:
   at least two bands each having a width of at most 5 mm, said bands formed of a laminate, and said bands joined to one another by a yarn manufacturing method;

said laminate formed of two mutually joined layers of alternately disposed laminar materials;

said layers including a top layer and a bottom layer with outer flat sides; and said layers including at least one first layer of flexible graphite having a thickness of at most 1 mm and a bulk density in the region of 0.7 to 1.8 g/cm$^3$, and at least one second layer of a reinforcing agent formed of a plastic foil having a tensile strength of at least 25 MPa and an elastic modulus of at least 0.4 GPa.

2. The packing yarn according to claim 1, wherein both of said top and bottom layers with said outer flat sides are formed of flexible graphite.

3. The packing yarn according to claim 1, wherein one of said top and bottom layers with said outer flat sides is formed of flexible graphite.

4. The packing yarn according to claim 1, wherein none of said top and bottom layers with said outer flat sides is formed of flexible graphite.

5. The packing yarn according to claim 1, wherein at least one of said at least two bands is separately twisted prior to processing into the packing yarn.

6. The packing yarn according to claim 1, wherein said bands have a width of at most 3 mm, and said at least one graphite layer is at least one foil having a thickness of at most 0.5 mm.

7. The packing yarn according to claim 1, wherein said bands have a width of at most 2 mm, and said at least one graphite layer is at least one foil having a thickness of at most 0.35 mm.

8. The packing yarn according to claim 1, wherein said plastic foil has a tensile strength of at least 50 mPa and an elastic modulus of at least 1 GPa.

9. The packing yarn according to claim 1, wherein said plastic foil has a tensile strength of at least 140 MPa and an elastic modulus of at least 2.5 GPa.

10. The packing yarn according to claim 1, wherein said plastic foil has a thickness of at most 50 µm.

11. The packing yarn according to claim 1, wherein said at least one graphite layer is at least one foil, and at least one of said two flat sides is covered by a foil selected from a group of perfluorinated polymeric hydrocarbons.

12. The packing yarn according to claim 1, wherein said at least one flexible graphite layer has a carbon content of at least 96% by weight.

13. The packing yarn according to claim 12, wherein said at least one flexible graphite layer has a carbon content of at least 99% by weight.

14. The packing yarn according to claim 1, wherein said reinforcing plastic foil is selected from the group consisting of polyester, polyimide and perfluorinated polymeric hydrocarbons.

15. The packing yarn according to claim 1, wherein said reinforcing plastic foil is made of stretched polytetrafluoroethylene.

16. The packing yarn according to claim 1, including an adhesive joining said reinforcing plastic foil to said at least one flexible graphite layer.

17. The packing yarn according to claim 1, wherein said reinforcing plastic foil is joined to said at least one flexible graphite layer without the use of an adhesive.

18. The packing yarn according to claim 1, wherein said reinforcing plastic foil is welded to said at least one flexible graphite layer using elevated temperatures.

19. The packing yarn according to claim 1, wherein said bands are twisted together, and said at least one graphite layer is at least one flexible graphite foil forming said laminate with said at least one plastic foil.

20. The packing yarn according to claim 19, wherein said twisted-together bands are formed of up to six superimposed layers, of said flexible graphite foil each of which is joined to at least one reinforcing plastic foil.

21. The packing yarn according to claim 19, wherein said twisted-together bands are formed of at most 12 bands of said flexible graphite foil reinforced with at least one plastic foil.

22. The packing yarn according to claim 1, wherein said joined bands together have a cross-sectional shape selected from the group consisting of round, elliptical, oval and rectangular.

23. A packing yarn, comprising:

at least two bands each having a width of at most 5 mm, said bands formed of a laminate, and said bands joined to one another by a yarn manufacturing method;

said laminate formed of at least one layer of flexible graphite having two flat sides, and at least one layer of reinforcing agent joined to at least one of said two flat sides;

said at least one layer of flexible graphite having a thickness of at most 1 mm and a bulk density in the region of 0.7 to 1.8 g/cm$^3$; and said at least one layer of reinforcing agent formed of a plastic foil with a tensile strength of at least 25 MPa and an elastic modulus of at least 0.4 GPa.

24. The packing yarn according to claim 23, wherein at least one of said at least two bands is separately twisted prior to processing into the packing yarn.

25. The packing yarn according to claim 23, wherein said bands have a width of at most 3 mm, and said at least one graphite layer is at least one foil having a thickness of at most 0.5 mm.

26. The packing yarn according to claim 23, wherein said bands have a width of at most 2 mm, and said at least one graphite layer is at least one foil having a thickness of at most 0.35 mm.

27. The packing yarn according to claim 23, wherein said plastic foil has a tensile strength of at least 50 MPa and an elastic modulus of at least 1 GPa.

28. The packing yarn according to claim 23, wherein said plastic foil has a tensile strength of at least 140 MPa and an elastic modulus of at least 2.5 GPa.

29. The packing yarn according to claim 23, wherein said plastic foil has a thickness of at most 50 µm.

30. The packing yarn according to claim 23, wherein said at least one graphite layer is at least one foil, and at least one of said two flat sides is covered by a foil selected from a group of perfluorinated polymeric hydrocarbons.

31. The packing yarn according to claim 23, wherein said at least one flexible graphite layer has a carbon content of at least 96% by weight.

32. The packing yarn according to claim 31, wherein said at least one flexible graphite layer has a carbon content of at least 99% by weight.

33. The packing yarn according to claim 23, wherein said reinforcing plastic foil is selected from the group consisting of polyester, polyimide and perfluorinated polymeric hydrocarbons.

34. The packing yarn according to claim 23, wherein said reinforcing plastic foil is made of stretched polytetrafluoroethylene.

35. The packing yarn according to claim 23, including an adhesive joining said reinforcing plastic foil to said at least one flexible graphite layer.

36. The packing yarn according to claim 23, wherein said reinforcing plastic foil is joined to said at least one flexible graphite layer without the use of an adhesive.

37. The packing yarn according to claim 23, wherein said reinforcing plastic foil is welded to said at least one flexible graphite layer using elevated temperatures.

38. The packing yarn according to claim 23, wherein said bands are twisted together, and said at least one graphite layer is at least one flexible graphite foil forming said laminate with said at least one plastic foil.

39. The packing yarn according to claim 38, wherein said twisted-together bands are formed of up to six superimposed layers of said flexible graphite foil each of which is joined to at least one reinforcing plastic foil.

40. The packing yarn according to claim 38, wherein said twisted-together bands are formed of at most 12 bands of said flexible graphite foil reinforced with at least one plastic foil.

41. The packing yarn according to claim 23, wherein said joined bands together have a cross-sectional shape selected from the group consisting of round, elliptical, oval and rectangular.

* * * * *